United States Patent
Kikuchi

(10) Patent No.: US 8,994,871 B2
(45) Date of Patent: Mar. 31, 2015

(54) FOCUS CONTROLLER

(75) Inventor: Tetsuo Kikuchi, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 440 days.

(21) Appl. No.: 13/552,813

(22) Filed: Jul. 19, 2012

(65) Prior Publication Data

US 2013/0021516 A1 Jan. 24, 2013

(30) Foreign Application Priority Data

Jul. 21, 2011 (JP) ................................. 2011-160118

(51) Int. Cl.
*H04N 5/232* (2006.01)
*G02B 7/28* (2006.01)
*G02B 7/36* (2006.01)
*G02B 7/38* (2006.01)
*G03B 13/36* (2006.01)

(52) U.S. Cl.
CPC .. *G02B 7/28* (2013.01); *G02B 7/36* (2013.01); *G02B 7/38* (2013.01); *H04N 5/232* (2013.01); *H04N 5/23209* (2013.01); *H04N 5/23212* (2013.01); *G03B 13/36* (2013.01); *H04N 5/23261* (2013.01)
USPC ........................................................ 348/345

(58) Field of Classification Search
None
See application file for complete search history.

(56) References Cited

U.S. PATENT DOCUMENTS

2011/0115939 A1* 5/2011 Hamada ..................... 348/222.1

FOREIGN PATENT DOCUMENTS

| JP | 2007-57763 | 3/2007 |
| JP | 2009-21929 | 1/2009 |
| JP | 2010-9009 | 1/2010 |

* cited by examiner

*Primary Examiner* — Twyler Haskins
*Assistant Examiner* — Angel L Garces-Rivera
(74) *Attorney, Agent, or Firm* — John C. Pokotylo; Straub & Pokotylo

(57) ABSTRACT

A focus controller includes an evaluation value generating unit and a control unit. An evaluation value generating unit obtains a first evaluation value based on a first signal output from a pixel part of an imaging unit by scanning the pixel part in a first direction and obtains a second evaluation value based on a second signal output from the pixel part by scanning the pixel part in a second direction different from the first direction. When a first movement direction of a focus lens based on the first evaluation value and a second movement direction of a focus lens based on the second evaluation value are in the same direction, the control unit performs an auto focus operation in order to move the focus lens in the movement direction determined as the same direction.

20 Claims, 11 Drawing Sheets

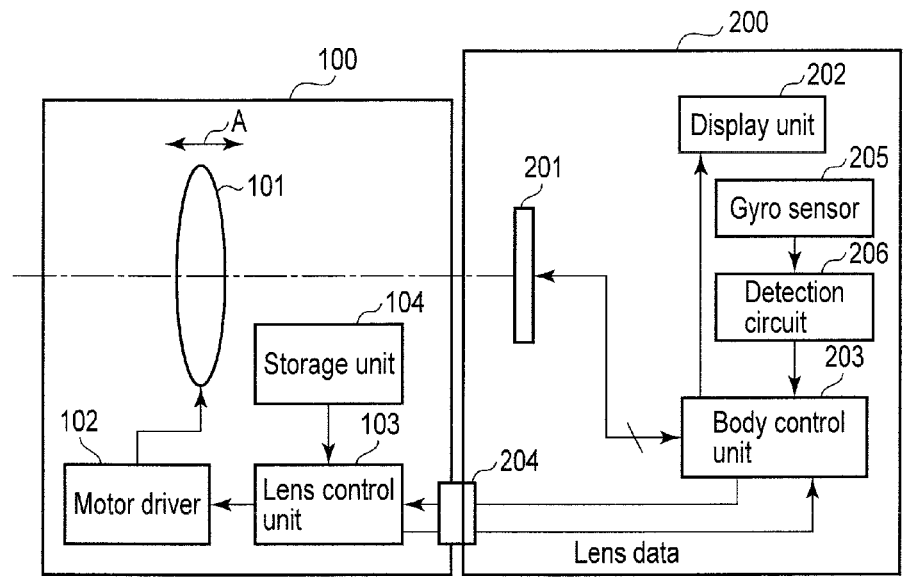
F I G. 1
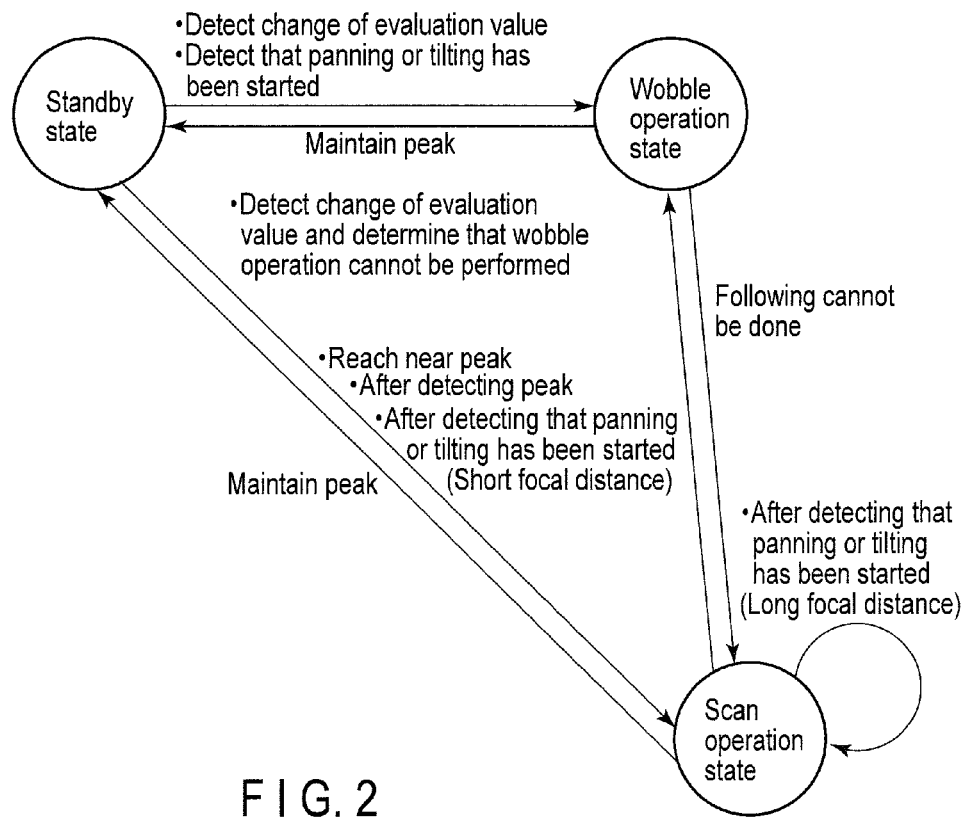
F I G. 2

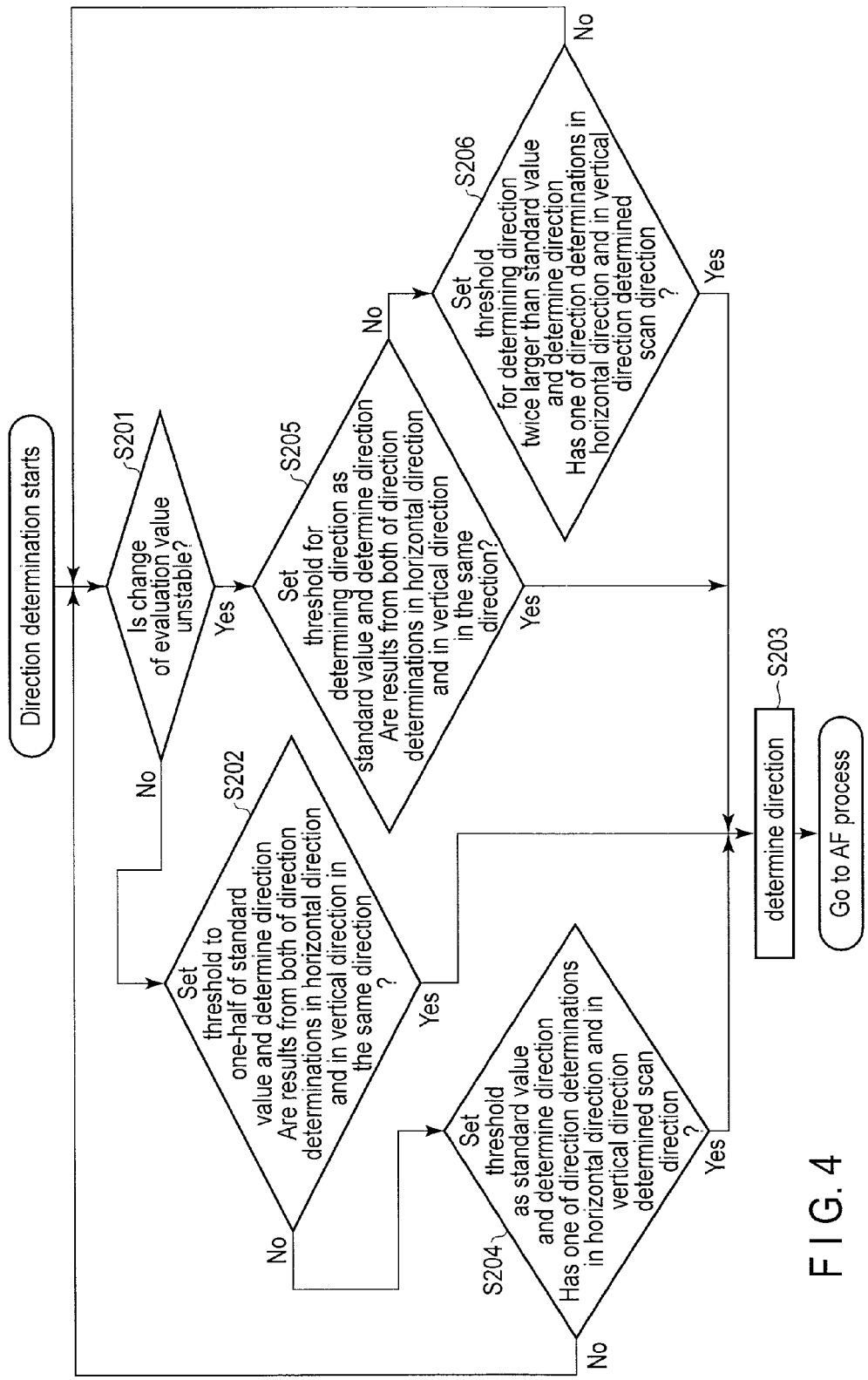
F I G. 4

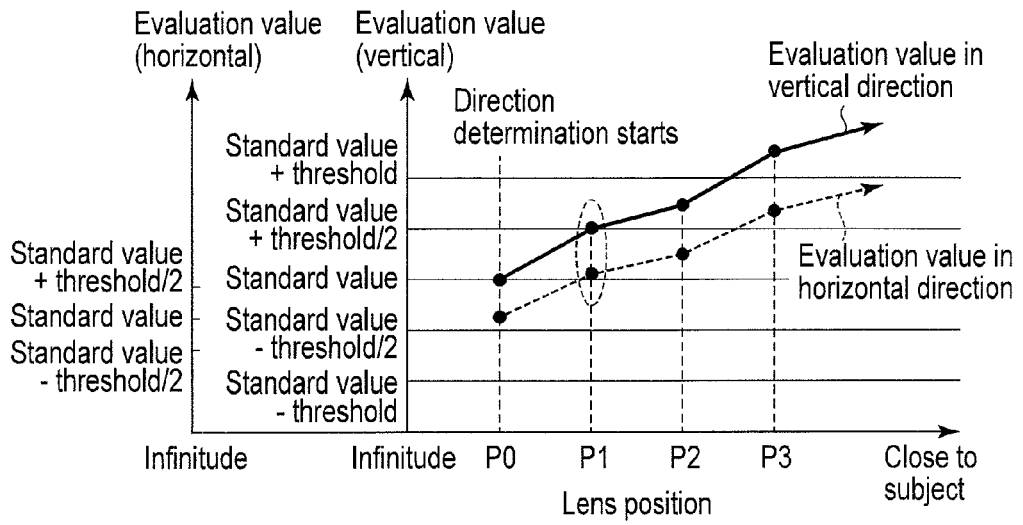
F I G. 5
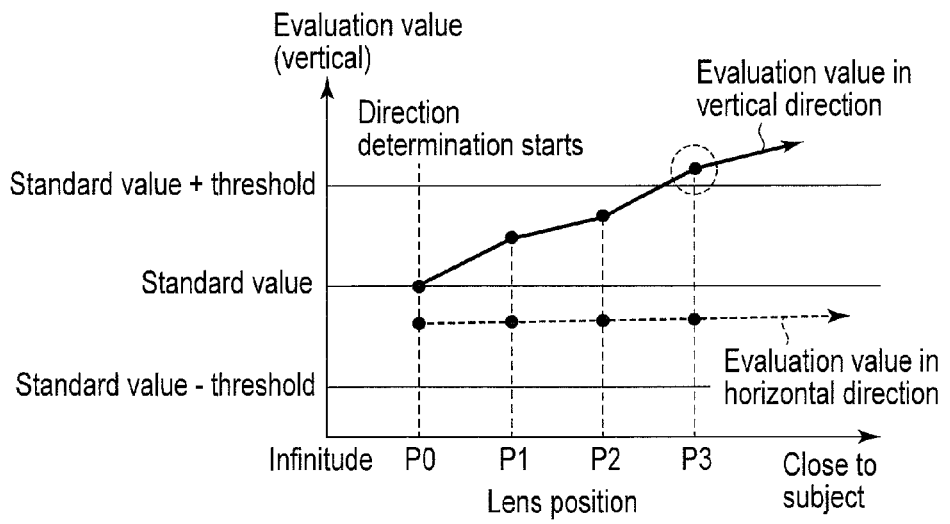
F I G. 6

| Item | Horizon 1 | Horizon 2 | Horizon 3 | Verticality | Focus direction determination |
|---|---|---|---|---|---|
| 1 | — | Same | Same | Same | Determined |
| 2 | — | — | Same | Same | Determined |
| 3 | — | Same | — | Same | Determined |
| 4 | Same | — | — | Same | Determined |
| 5 | — | Same | Same | — | Determined |
| 6 | — | — | — | ○ | Determined |
| 7 | — | — | ○ | — | Determined |
| 8 | — | ○ | — | — | Determined |
| 9 | ○ | — | — | — | Determined |

F I G. 1 1 A

| Item | Horizon 1 | Horizon 2 | Horizon 3 | Verticality | Focus direction determination |
|---|---|---|---|---|---|
| 1 | — | Same | Same | Same | Determined |
| 2 | — | — | Same | Same | Determined |
| 3 | — | Same | — | Same | Determined |
| 4 | Same | — | — | Same | Determined |
| 5 | — | Same | Same | — | Not determined |
| 6 | — | — | — | ○ | Not determined |
| 7 | — | — | ○ | — | Not determined |
| 8 | — | ○ | — | — | Not determined |
| 9 | ○ | — | — | — | Not determined |

F I G. 1 1 B

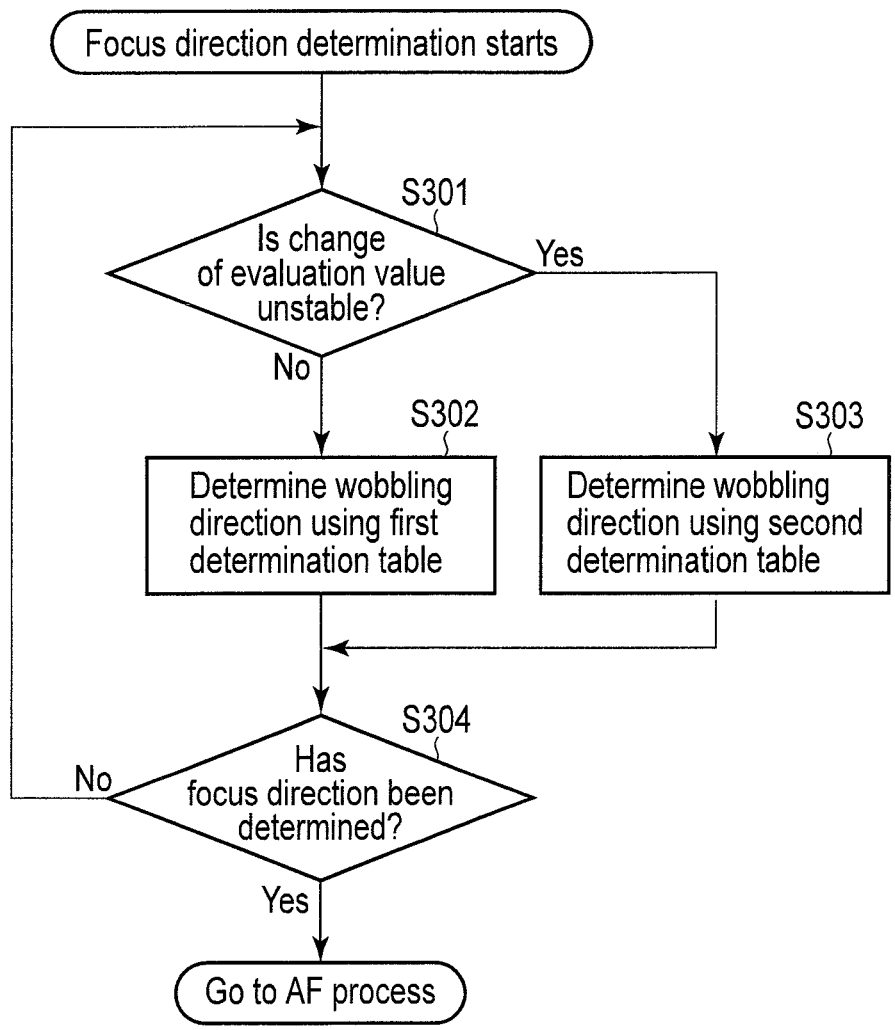
F I G. 12

FOCUS CONTROLLER

CROSS-REFERENCE TO RELATED APPLICATIONS

This application is based upon and claims the benefit of priority from prior Japanese Patent Application No. 2011-160118, filed Jul. 21, 2011, the entire contents of which are incorporated herein by reference.

BACKGROUND OF THE INVENTION

1. Field of the Invention

The present invention relates to a focus controller for an image pickup apparatus.

2. Description of the Related Art

A contrast method has been known as one of auto focus (hereinafter, referred to as AF) control methods. In the contrast method, a focus lens is moved in the optical axis direction to evaluate the contrast of the subject. The lens position of the maximum contrast of the subject is set as a focus position. The focus lens is moved to the focus position. In a usual contrast method, a signal is obtained by scanning a pixel part provided in an imaging unit. An evaluation value (AF evaluation value) is calculated according to the signal. The evaluation value is evaluated to evaluate the contrast of the subject.

Techniques relating to such a contrast method are proposed, for example, in Jpn. Pat. Appln. KOKAI Publication No. 2007-57763 and Jpn. Pat. Appln. KOKAI Publication No. 2009-21929.

Jpn. Pat. Appln. KOKAI Publication No. 2007-57763 proposes that, to control the movement of the focus lens, both evaluation values are used: one is calculated from the signal obtained by scanning the pixel part provided in the imaging unit in the vertical direction; and the other is calculated from the signal obtained by scanning the pixel part in the horizontal direction. Further, Jpn. Pat. Appln. KOKAI Publication No. 2007-57763 proposes that, to control the movement of the focus lens, the larger evaluation value or, namely, the evaluation value having more high frequency components is weighted.

Jpn. Pat. Appln. KOKAI Publication No. 2009-21929 proposes that motion vectors in the image are calculated from the signals obtained by scanning the pixel part, the evaluation values are weighted based on the motion vectors and added, and the added evaluation values are used to control the movement of the focus lens in an image pickup apparatus where both evaluation values are used: one is calculated from the signal obtained by scanning the pixel part in the vertical direction; and the other is calculated from the signal obtained by scanning the pixel part in the horizontal direction in order to control the movement of the focus lens.

BRIEF SUMMARY OF THE INVENTION

According to a first aspect of the invention, there is provided a focus controller for an image pickup apparatus that includes an optical system including a focus lens movable in an optical axis direction and generating an optical image of a subject and also includes an imaging unit including a plurality of pixel parts and imaging the optical image, comprising: an evaluation value generating unit configured to obtain a first evaluation value based on a first signal output from the pixel part by scanning the pixel part in a first direction and obtain a second evaluation value based on a second signal output from the pixel part by scanning the pixel part in a second direction different from the first direction, the first and second evaluation values indicating a contrast of the subject; and a control unit configured to, while moving the focus lens, determine a movement direction of the focus lens to focus the focus lens based on each of changes of the first evaluation value and the second evaluation value and, in the case where a first movement direction is determined based on the first evaluation value and a second movement direction is determined based on the second evaluation value are in the same direction, perform an auto focus operation in order to move the focus lens in the movement direction determined as the same direction.

According to a second aspect of the invention, there is provided a focus controller for an image pickup apparatus that includes an optical system including a focus lens movable in an optical axis direction and generating an optical image of a subject and also includes an imaging unit including a plurality of pixel parts and imaging the optical image, comprising: an evaluation value generating unit configured to obtain a first evaluation value based on a first signal output from the pixel part by scanning the pixel part in a first direction and obtain a second evaluation value based on a second signal output from the pixel part by scanning the pixel part in a second direction different from the first direction, the first and second evaluation values indicating a contrast of the subject; and a control unit configured to, while the focus lens is minutely vibrated with given amplitude, determine a movement direction of the focus lens to focus the focus lens based on each of changes of the first evaluation value and the second evaluation value and, in the case where a first movement direction is determined based on the first evaluation value and a second movement direction is determined based on the second evaluation value are in the same direction, perform an auto focus operation in order to move the focus lens in the movement direction determined as the same direction.

According to a third aspect of the invention, there is provided a focus controller for an image pickup apparatus that includes an optical system including a focus lens movable in an optical axis direction and generating an optical image of a subject and also includes an imaging unit including a plurality of pixel parts and imaging the optical image, comprising: an evaluation value generating unit configured to obtain evaluation values by filtering a signal using the filers, the signal outputting from the pixel part by scanning the pixel part in a given direction, the evaluation values indicating a contrast of the subject; an unstable state determination unit configured to determine a state of the image pickup apparatus or subject is an unstable state; and a control unit configured to, while the focus lens is minutely vibrated with given amplitude, determine movement directions of the focus lens to focus the focus lens based on each of changes of the evaluation values, wherein when at least two movement directions based on the evaluation values are in the same direction the control unit finally determines the movement direction is the same direction, and the control unit do not finally determines the movement direction when the unstable state determination unit determines the state of the image pickup apparatus or subject is unstable, even if at least two movement directions based on the evaluation values are in the same direction.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram view of an image pickup apparatus having a focus controller according to an embodiment of the present invention;

FIG. 2 is a schematic view of an AF process in the focus controller according to an embodiment of the present invention;

FIG. 4 is a flowchart of an example of a focus direction determination process during a scan;

FIG. 5 is a view of an example of the focus direction determination in S202;

FIG. 6 is a view of an example of the focus direction determination in S204;

FIGS. 11A and 11B are views of exemplary determination tables;

FIG. 12 is a flowchart of an exemplary process for determining a focus direction process during a wobble operation;

DETAILED DESCRIPTION OF THE INVENTION

Figure 3:
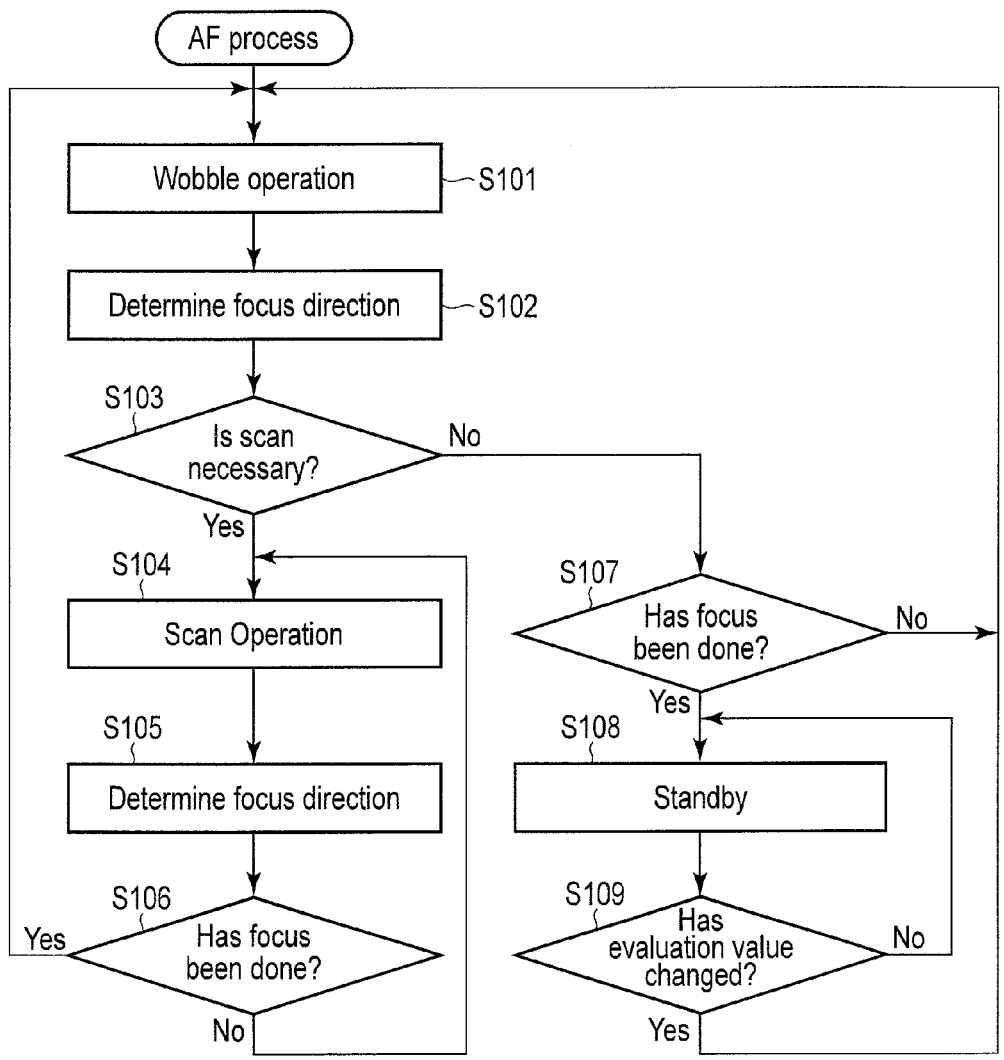
FIG. 3 is a flowchart of the AF process according to an embodiment of the present invention.

Embodiments of the present invention will be described below with reference to the drawings.

FIG. 1 is a diagram view of an image pickup apparatus having a focus controller according to an embodiment of the present invention. The image pickup apparatus shown in FIG. 1 includes a conversion lens 100 and a camera body 200. In the image pickup apparatus, the conversion lens 100 is detachably attached to the camera body 200 through a lens mount (not shown) provided on the camera body 200.

The conversion lens 100 includes an imaging lens 101, a motor driver 102, a lens control unit 103, and a storage unit 104. Although the conversion lens 100 actually includes a diaphragm control mechanism, a zoom mechanism or the like, they are omitted in FIG. 1.

The imaging lens 101 is an optical system including a focus lens and configured to generate an optical image of a subject (not shown) on an imaging device 201 in the camera body 200. The motor driver 102 includes a drive mechanism including, for example, a motor (focus motor) to move the focus lens in the optical axis direction (A-direction shown in FIG. 1) according to a control signal from the lens control unit 103.

The lens control unit 103 is an LSI combining a microcomputer and a control circuit that controls each part in the conversion lens 100. The lens control unit 103 transmits a control signal to the motor driver 102 based on the control signal output from a body control unit 203 in the camera body 200. The lens control unit 103 also performs an AF process with the focus lens based on a synchronization signal transmitted from the body control unit 203, and the information indicating a phase with the synchronization signal. The AF process will be described in detail below.

The storage unit 104 stores the characteristic information unique to each of conversion lenses 100. The lens control unit 103 transmits the characteristic information stored in the storage unit 104 to the body control unit 203 in response to a request from the body control unit 203.

The conversion lens 100 according to the present embodiment preferably performs a wobble operation. The wobble operation denotes a motion where a focus lens is vibrationally moved in the optical axis direction to gradually reach the focus position. It is generally determined, according to the focus motor performance or the character of the lens group in the conversion lens 100, whether the wobble operation can be performed. In a usual wobble operation, it is necessary to vibrate the focus lens in the optical axis direction at a frequency of about 15 to 30 Hz (referred to as a wobbling frequency). Accordingly, the conversion lens 100 preferably includes a focus motor that can vibrate the focus lens at about 15 to 30 Hz, and a focus lens that is lightweight enough to enable such a relatively high speed vibration.

In the above-mentioned example, the lens control unit 103 is an LSI combining a microcomputer and a control circuit that controls each part in the conversion lens 100. However, the microcomputer is not necessarily combined with the control circuit. A plurality of LSIs can also constitute the microcomputer and the control circuit.

The camera body 200 includes the imaging device 201, a display unit 202, the body control unit 203, a mount connecting point 204, a gyro sensor 205, and a detection circuit 206. Although the camera body 200 actually also includes, for example, a release button used for the user's instruction for a shooting operation, and a storage unit for storing image data obtained by the shooting operation, they are omitted in FIG. 1.

The imaging device 201 includes a pixel part. The pixel part includes photoelectric conversion elements that are two-dimensionally placed in order to convert an incident optical image into an electrical signal (image signal) through the conversion lens 100. The imaging device 201 includes, for example, a CCD image sensor or a MOS image sensor.

The display unit 202 is provided, for example, at the back side of the camera body 200. The display unit 202 displays an image based on the display image data generated in the body control unit 203 based on the image signal output from the imaging device 201.

The body control unit 203 is an LSI combining a CPU, a control circuit that controls each part in the camera body 200, and a signal processing circuit that performs various signal processes. The body control unit 203 controls each part in the camera body 200 to execute various operation sequences. Further, the body control unit 203 has a function as a control unit to output a control signal and a synchronization signal to the lens control unit 103 through the lens mount. The synchronization signal is for synchronizing the exposure operation of the imaging device 201 with the drive operation of the focus lens. The body control unit 203 controls the operation of the imaging device 201 to convert an image signal output from the imaging device 201 into image data that is a digital signal. Further, the body control unit 203 performs various signal processes, for example, a white balance control on the image data. Further, the body control unit 203 outputs the image data obtained by the various signal processes to the display unit 202 in order to control the image display on the display unit 202. Further, the body control unit 203 has a function as an evaluation value generating unit to generate an evaluation value for an AF process from the image data output from the imaging device 201. The evaluation value is generated by extracting high-frequency components from the image data by performing a high-pass filter (HPF) process on the image data, and then integrating the high-frequency components extracted from an AF area predetermined in the shooting screen. Furthermore, the body control unit 203 has a function as a motion vector detecting unit to detect motion vectors according to the change of the image data between a plurality of frames.

In the above-mentioned example, the body control unit 203 is an LSI combining a CPU, a control circuit that controls each part in the camera body 200, and a signal processing circuit that performs various signal processes. However, a plurality of LSIs can also constitute the CPU, the control circuit, and the signal processing circuit.

The mount connecting point 204 is provided in the lens mount. The mount connecting point 204 is an interface for connecting the lens control unit 103 to the body control unit 203 so that the lens control unit 103 can communicate with the body control unit 203.

The gyro sensor 205 functioning as an example of the motion detecting unit generates a signal according to an angular speed in two axial directions. In the following description, an X axis denotes a direction that becomes horizontal to the surface of the earth when the camera body 200 is set sideways. A Y axis denotes a direction that becomes vertical to the surface of the earth when the camera body 200 is set sideways. The gyro sensor 205 is configured to detect the angular speed when the camera body 200 moves in the X axis direction or in the Y axis direction defined in such a manner. The detection circuit 206 performs, for example, a filtering process (differential process) on the signal output from the gyro sensor 205, and then outputs the processed output signal to the body control unit 203. The body control unit 203 detects the motion amount of the camera body 200 based on the output from the detection circuit 206 and then detects, from the motion amount, that the camera body 200 pans or tilts. In this case, the panning denotes that the camera body 200 moves in a direction horizontal to the surface of the earth. The tilting denotes that the camera body 200 moves in a direction vertical to the surface of the earth. The "panning" and "tilting" in the present embodiment include both of those generated when the user purposely moves the camera body 200 and those which are generated from, for example, the user's hand shaking unintentionally.

The body control unit 203 functions an unstable state determination unit which determines that an unstable state of the camera body 200 by such as the "panning", "tilting", and hand shaking or determines that an unstable state of the subject by a subject shake.

The operation of a focus controller according to the present embodiment will be described below. FIG. 2 is a schematic view of an AF process in the focus controller according to the present embodiment.

As shown in FIG. 2, in the AF process according to the present embodiment, the image pickup apparatus switches the state to one of three types of states, a wobble operation state, a scan operation state and a standby state.

Under the wobble operation state, the focus lens wobbles to move to the focus position. At that time, the body control unit 203 instructs the lens control unit 103 to perform a wobble operation. The related art, for example, disclosed in Jpn. Pat. Appln. KOKAI Publication No. 2010-9009 can be used as the detailed technique for the wobble operation. Accordingly, the description in detail is omitted herein. After the wobble operation, the body control unit 203 determines the movement direction of the focus lens from the change of the evaluation value when the focus lens is minutely vibrated with given amplitude. Specifically, the body control unit 203 determines the movement direction of the focus lens at a side where the evaluation value increases. The focus direction determination will be described below. The body control unit 203 instructs the lens control unit 103 to gradually move the focus lens to the focus position according to the determined movement direction.

When the focus position is misaligned too much to follow the subject only by the wobble operation under the wobble operation state, the state of the image pickup apparatus is switched to the scan operation state. At that time, the body control unit 203 instructs the lens control unit 103 to perform a scan operation for a hill-climbing AF. Specifically, the body control unit 203 instructs the lens control unit 103 to move the focus lens to the focus position little by little. Even in this case, the body control unit 203 determines the movement direction of the focus lens. When the conversion lens 100 that can wobble is mounted, the scan operation of the focus lens that exceeds a maximum AF evaluation value is not performed. A final adjustment of the focus lens to the focus position is performed by the wobble operation. On the other hand, when the conversion lens 100 that cannot wobble is mounted, the final adjustment of the focus lens to the focus position is performed by the scan operation. After the hill-climbing AF has been completed under the scan operation state, the state of the image pickup apparatus is switched to the standby state.

When the focus lens focuses, the state of the image pickup apparatus becomes the standby state. Under the standby state, the body control unit 203 compares the current evaluation value with the evaluation value before the state is switched to the standby state to determine whether the difference between both of the evaluation values is equal to or more than a given level. When the difference between the current evaluation value and the evaluation value before the state is switched to the standby state is equal to or more than the given level, this indicates that the contrast has been changed. In this case, the standby state is terminated. Even though the contrast has not been changed, the focus can be worse in the case where the camera broadly turns, in other words, the panning or tilting occurs. Accordingly, the standby state is also terminated in this case. When the conversion lens 100 that can wobble is mounted at the termination of the standby state, the state of the image pickup apparatus is switched to the wobble operation state. On the other hand, when the conversion lens 100 that cannot wobble is mounted at the termination of the standby state, the state of the image pickup apparatus is switched to the scan operation state.

The three states shown in FIG. 2 are separately used to continue the AF process, for example, during a motion picture record. This can continue bringing the subject into focus.

Next, an example of the AF process according to the present embodiment will be described with reference to FIG. 3. In the example shown in FIG. 3, the body control unit 203 first starts a wobble operation (S101). The body control unit 203 instructs the lens control unit 103 to minutely vibrate the focus lens for the wobble operation. After the wobble operation has been started, the body control unit 203 determines the focus direction according to the change of the evaluation value during the wobble operation (S102). The focus direction determination during the wobble operation will be described in detail below.

After the focus direction has been determined, the body control unit 203 determines whether a scan operation is necessary (S103). For example, when the focus on the subject is largely changed because, for example, the user pans or tilts the image pickup apparatus, it is determined that a scan operation is necessary.

When it is determined in S103 that a scan operation is necessary, the body control unit 203 starts a scan operation (S104). After the scan operation is started, the body control unit 203 determines the focus direction according to the change of the evaluation value during the scan operation (S105). The focus direction determination during the scan operation will be described in detail below.

After the focus direction has been determined, the body control unit 203 determines whether the focus lens focuses (S106). The "focus state" in S106 denotes a state where the final adjustment of the focus lens to the focus position in the above-mentioned scan operation state can be performed. Accordingly, it is determined in S106, for example, whether the evaluation value has increased by a predetermined value enough to enable the wobble operation to start. When it is determined in S106 that the focus lens is not in the focus state, the body control unit 203 turns the process back to S104 in order to continue the scan operation. When it is determined in S106 that the focus lens focuses, the body control unit 203 turns the process back to S101 in order to perform the wobble operation for the focus lens adjustment.

When it is determined in S103 that a scan operation is not necessary, the body control unit 203 determines, while continuing the wobble operation, whether the focus lens focuses (S107). Note that the "focus state" in S107 denotes a state where the focus lens has reached the focus position. When it is determined in S107 that the focus lens is not in the focus state, the body control unit 203 turns the process back to S101 in order to continue the wobble operation. When it is determined in S107 that the focus lens is in the focus state, the body control unit 203 terminates the wobble operation, and switches the state to the standby state (S108).

After the standby state has been set, the body control unit 203 determines whether the evaluation value has changed (S109). When it is determined in S109 that the evaluation value has not changed, the body control unit 203 turns the process back to S108 in order to continue the standby state. On the other hand, when it is determined in S109 that the evaluation value has changed, the body control unit 203 returns the process to S101.

Next, the focus direction determination will be described in detail.

First, the focus direction determination during a scan operation will be described. The movement direction of the focus lens (hereinafter, referred to as a scan direction) is determined during a scan operation according to the magnitude relationship between a standard evaluation value AFval_base_x and an evaluation value AFval_x(n) of a frame nVD in which the focus direction is determined. For example, it is assumed that the standard evaluation value AFval_base_x is the evaluation value at the beginning of the scan operation and the x is one of h and v. The "h" denotes the evaluation value in the horizontal direction or, namely, an evaluation value calculated according to an image signal obtained by scanning the pixel part of the imaging device 201 in the horizontal direction (a first evaluation value). The "v" denotes the evaluation value in the vertical direction or, namely, an evaluation value calculated according to an image signal obtained by scanning the pixel part of the imaging device 201 in the vertical direction (a second evaluation value).

As the specific process of the focus direction determination, it is determined which of the following two conditions the evaluation value AFval_x(n) of the frame nVD satisfies:
(Condition 1) When the increased amount of the evaluation value AFval_x(n) of the frame nVD is equal to or larger than the threshold in relation to the standard evaluation value AFval_base_x, in other words, when the following (expression 1) is satisfied, it is assumed that the scan direction can be determined.

$$AFval\_x(n) \geq AFval\_base\_x + \text{the threshold} \quad \text{(expression 1)}$$

When the (Condition 1) is satisfied, it can be considered that the focus position is in the same direction as the current scan direction. Accordingly, when it is determined that the (Condition 1) is satisfied, the scan direction for the frames that follow is determined as the same direction of the previous scan direction.
(Condition 2) When the decreased amount of the evaluation value AFval_x(n) of the current frame nVD is equal to or smaller than the threshold in relation to the standard evaluation value AFval_base_x, in other words, when the following (expression 2) is satisfied, it is assumed that the scan direction can be determined.

$$AFval\_x(n) \leq AFval\_base\_x - \text{the threshold} \quad \text{(expression 2)}$$

When the (Condition 2) is satisfied, it can be considered that the focus position is in the direction opposite to the current scan direction. Accordingly, when it is determined that the (Condition 2) is satisfied, the scan direction for the frames that follow is determined as the direction opposite to the previous scan direction.

When neither the (Condition 1) nor the (Condition 2) is satisfied, it is considered that the scan direction cannot be determined.

The threshold is also calculated with the assumption that the following (expression 3) is the standard threshold. The threshold is for determining whether each of the conditions is satisfied.

$$\text{The threshold} = AFval\_base\_x \times Coeff \quad \text{(expression 3)}$$

Note that a coefficient Coeff of the (expression 3) ranges, for example, from 0.1 to 0.2.

FIG. 4 is a flowchart of an example of a focus direction determination during a scan operation. In FIG. 4, the body control unit 203 determines whether the change of the evaluation value is unstable (S201). In this case, the unstable state of the change of the evaluation value in S201 denotes a state where there is a factor causing the change of the evaluation value to be unstable, for example, the camera body 200's motion such as panning or tilting, or a subject shake. To determine such a state, it is determined in S201, for example, whether the motion amount of the camera body 200 or the motion vector amount exceeds a predetermined threshold. The motion amount is detected by the detection circuit 206. The motion vector amount is calculated by the body control unit 203. When the amount exceeds the threshold, the body control unit 203 determines the state as unstable. The determination in S201 will be described in detail below.

When it is determined in S201 that the change of the evaluation value is stable, the body control unit 203 sets the threshold smaller than the standard value (for example, sets the threshold to one-half of the standard threshold), and then determines the focus direction based on the evaluation value in the horizontal direction and the focus direction based on the evaluation value in the vertical direction. Then, the body control unit 203 determines whether the scan direction obtained by the focus direction determination based on the evaluation value in the horizontal direction is in the same direction as the scan direction obtained by the focus direction determination based on the evaluation value in the vertical direction (S202).

FIG. 5 is a view of an example of the focus direction determination in S202. FIG. 5 is a view of an example when the focus lens is gradually moved from a start position P0 of the focus direction determination in a direction moving closer to the subject. Hereinafter, the movement direction of the focus lens that moves closer to the subject is referred to as a close distance direction. On the contrary, the movement direction of the focus lens that moves far away from the subject is referred to as a far distance direction.

In the example shown in FIG. 5, the body control unit 203 sets the evaluation value in the horizontal direction and the evaluation value in the vertical direction at a lens position P0 as a standard evaluation value AFval_base h and a standard evaluation value AFval_base v, respectively. Then, the body control unit 203 obtains evaluation values while moving the focus lens to lens positions P1, P2, P3, . . . in order to synchronize the focus lens with the image frame of the imaging device 201.

Every time an evaluation value is obtained, the body control unit 203 determines whether evaluation values AFval_h(n) and AFval_v(n) satisfy one of the (Condition 1) and the (Condition 2). In the example shown in FIG. 5, an evaluation value AFval_h(1) in the horizontal direction at a lens position P1 exceeds (the standard evaluation value AFval_base h+the threshold/2), and an evaluation value AFval_v(1) in the vertical direction at a lens position P1 also exceeds (the standard evaluation value AFval_base v+the threshold/2). In this case, the body control unit 203 determines, according to both of the focus direction determinations based on the evaluation value in the horizontal direction and based on the evaluation value in the vertical direction, that the (Condition 1) is satisfied. Further, because the (Condition 1) is satisfied according to both of the focus direction determinations based on the evaluation value in the horizontal direction and based on the evaluation value in the vertical direction, the body control unit 203 determines that both of the scan directions determined by the focus direction determination based on the evaluation value in the horizontal direction, and determined by the focus direction determination based on the evaluation value in the vertical direction are in the same direction, in other words, both of the scan directions are in the same direction as the previous scan direction.

When it is determined in S202 that the scan directions are in the same direction, the body control unit 203 finally determines the focus direction (S203). In this case, either can be adopted as the determined scan direction: the result from the focus direction determination based on the evaluation value in the horizontal direction or the result from the focus direction determination based on the evaluation value in the vertical direction. After the focus direction has been finally determined, the body control unit 203 forwards the process to S106 shown in FIG. 3. Once the focus direction has been determined, the focus direction determinations that follow can be omitted.

When it is determined in S202 that the scan directions are not in the same direction, the body control unit 203 performs both of the focus direction determinations based on the evaluation value in the horizontal direction and based on the evaluation value in the vertical direction, setting a standard value as the threshold. Then the body control unit 203 determines whether the scan direction has been determined according to at least one of the focus direction determinations based on the evaluation value in the horizontal direction and based on the evaluation value in the vertical direction (S204).

FIG. 6 is a view of an example of the focus direction determination in S204. Even in S204, the body control unit 203 determines whether the evaluation values AFval_h(n) and AFval_v(n) satisfy one of the (Condition 1) and the (Condition 2). In the example shown in FIG. 6, an evaluation value AFval_V(3) in the vertical direction at a lens position P3 exceeds (the standard evaluation value AFval_base v+the threshold). In this case, the body control unit 203 determines, according to the focus direction determination based on the evaluation value in the vertical direction, that the (Condition 1) is satisfied, in other words, the scan direction is in the same direction as the previous scan direction.

When it is determined in S204 that the scan direction has been determined according to at least one of the focus direction determinations based on the evaluation value in the horizontal direction and based on the evaluation value in the vertical direction, the body control unit 203 forwards the process to S203 to finally determine the focus direction. In this case, the focus direction determinations based on the evaluation value in the horizontal direction and based on the evaluation value in the vertical direction are performed. A result of one of the determinations, where the scan direction has been determined, is adopted as the determined scan direction. When the scan directions can be determined from both of the determination results, the scan direction determined, for example, from the focus direction determination based on the evaluation value in the vertical direction is preferentially adopted. After the focus direction has been finally determined, the body control unit 203 forwards the process to S106 shown in FIG. 3.

When it is determined in S204 that the scan direction has been determined from neither of the focus direction determinations, based on the evaluation value in the horizontal direction nor based on the evaluation value in the vertical direction, the body control unit 203 returns the process to S201. In this case, the next frame is subjected to the process from S201.

When it is determined in S201 that the change of the evaluation value is unstable, the body control unit 203 sets the standard value as the threshold, and then determines the focus directions based on the evaluation value in the horizontal direction and based on the evaluation value in the vertical direction. Then, the body control unit 203 determines whether the scan direction obtained by the focus direction determination based on the evaluation value in the horizontal direction is in the same direction as the scan direction obtained by the focus direction determination based on the evaluation value in the vertical direction (S205).

Figure 7:
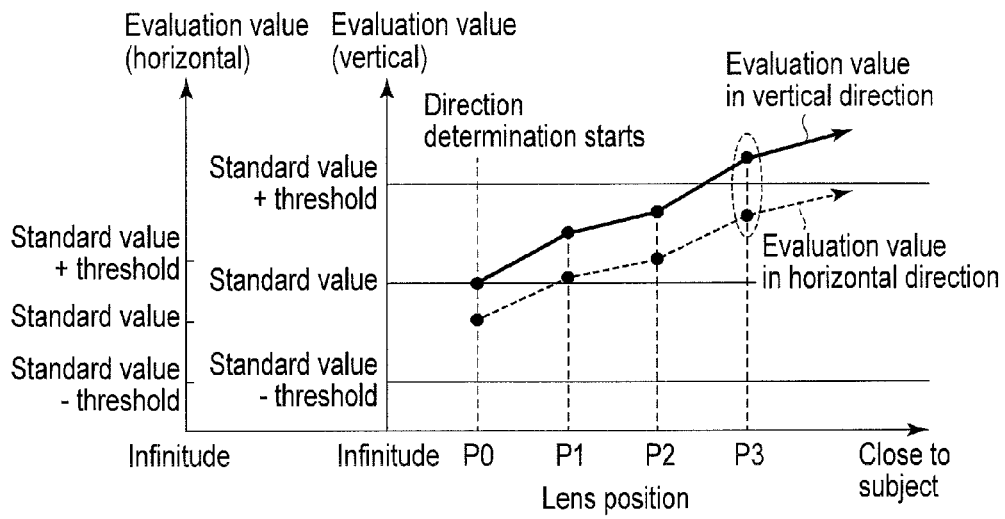
FIG. 7 is a view of an example of the focus direction determination in S205.

FIG. 7 is a view of an example of the focus direction determination in S205. Even in S205, the body control unit 203 determines whether the evaluation values AFval_h(n) and AFval_v(n) satisfy one of the (Condition 1) and the (Condition 2). In the example shown in FIG. 7, an evaluation value AFval_h(3) in the horizontal direction at a lens position P3 exceeds (the standard evaluation value AFval_base h+the threshold), and an evaluation value AFval_v(3) in the vertical direction at a lens position P3 also exceeds (the standard evaluation value AFval_base v+the threshold). In this case, because the (Condition 1) is satisfied according to both of the focus direction determinations based on the evaluation value in the horizontal direction and based on the evaluation value in the vertical direction, the body control unit 203 determines that the scan directions are in the same direction, in other words, are in the same direction as the previous scan direction.

When it is determined in S205 that the scan directions are in the same direction, the body control unit 203 forwards the process to S203 to finally determine the focus direction. In this case, either can be adopted as the determined scan direction: the result from the focus direction determination based on the evaluation value in the horizontal direction or the result from the focus direction determination based on the evaluation value in the vertical direction. After the focus direction has been finally determined, the body control unit 203 forwards the process to S106 shown in FIG. 3.

When it is determined in S205 that the scan directions are not in the same direction, the body control unit 203 performs both of the focus direction determinations based on the evaluation value in the horizontal direction and based on the evaluation value in the vertical direction, setting the threshold larger than the standard value (for example, twice larger than the standard threshold). Then the body control unit 203 determines whether the scan direction has been determined according to at least one of the focus direction determinations based on the evaluation value in the horizontal direction and based on the evaluation value in the vertical direction (S206).

Figure 8:
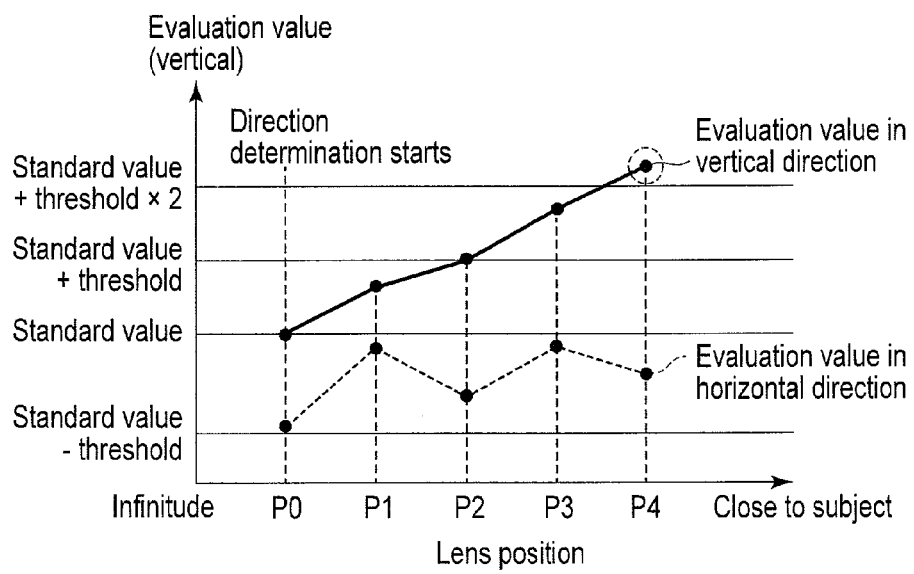
FIG. 8 is a view of an example of the focus direction determination in S206.

FIG. 8 is a view of an example of the focus direction determination in S206. For example, when an AF process is performed to bring the head of a person who is walking quickly into focus, the evaluation value in the horizontal direction repeatedly increases and decreases as shown in FIG. 8. In this case, the focus direction is finally determined according to the focus direction determination only from the evaluation value in the vertical direction. In the example of FIG. 8, an evaluation value AFval_v(4) in the vertical direction at a lens position P4 exceeds (the standard evaluation value AFval_base v+the threshold×2). In this case, the body control unit 203 determines that the (Condition 1) is satisfied according to the focus direction determinations based on the evaluation value in the vertical direction, in other words, the scan direction is in the same direction as the previous scan direction.

When it is determined in S206 that the scan direction has been determined according to at least one of the focus direction determinations based on the evaluation value in the horizontal direction and based on the evaluation value in the vertical direction, the body control unit 203 forwards the process to S203 to finally determine the focus direction. In this case, the focus direction determinations based on the evaluation value in the horizontal direction and based on the evaluation value in the vertical direction are performed. A result from one of the determinations, where the scan direction has been determined, is adopted as the determined scan direction. When the scan directions can be determined from both of the determination results, the scan direction determined, for example, from the focus direction determination based on the evaluation value in the vertical direction is preferentially adopted. After the focus direction has been finally determined, the body control unit 203 forwards the process to S106 shown in FIG. 3.

When it is determined in S206 that the focus direction can be determined from neither of the focus direction determinations, based on the evaluation value in the horizontal direction nor based on the evaluation value in the vertical direction, the body control unit 203 returns the process to S201. In this case, the next frame is subjected to the process from S201.

As described above, to determine the focus direction during a scan operation, it is determined first whether the results from the focus direction determinations based on the evaluation value in the horizontal direction and based on the evaluation value in the vertical direction are in the same direction. In consideration of the results from the focus direction determinations based on the evaluation values in two directions, the focus direction is finally determined. This can reliably determine the focus direction. Further, at that time, the threshold is for determining the scan direction in the focus direction determination based on the evaluation value in each of the directions. Even though the threshold is set smaller than the standard threshold, the focus direction is reliably determined. This can prevent the occurrence of an error in the scan direction determination or a false focus. Further, the small threshold can promptly determine the scan direction. Thus, it is also determined promptly, for example, that the scan directions are in the opposite direction. This can change the scan direction in a shorter time. This prevents the lens from unnecessarily driving in the opposite direction. Such an action can, for example, reduce the time to display a defocus image during a live view display in the AF process.

On the other hand, when the focus direction is finally determined only from the evaluation value in one direction, the threshold for determining the scan direction is set larger than the threshold when the focus direction is finally determined from the evaluation values in two directions. Although this takes more time to determine the scan direction, this can reliably determine the focus direction and can prevent the occurrence of an error in the scan direction determination or a false focus.

Even though the change of the evaluation value is unstable, the determination is performed in the same manner as the case where the change of the evaluation value is stable. When the change of the evaluation value is unstable, the threshold for determining the scan direction is set larger than the threshold when the change of the evaluation value is stable. Although this takes more time to determine the scan direction, this can reliably determine the focus direction and can prevent the occurrence of an error in the scan direction determination or a false focus.

Next, the focus direction determination during a wobble operation will be described. Unlike during a scan operation, the focus direction during a wobble operation is determined according to the magnitude relationship among the evaluation value of a current frame nVD the focus direction of which is to be determined, the evaluation value of a frame (n−1)VD that is one frame previous to the current frame, and the evaluation value of a frame (n−2)VD that is two frames previous to the current frame. Specifically, the focus direction is determined according to an amount of change in the evaluation value AFval_dlt_x (the x corresponds to h1, h2, h3, or v) shown in the following (Expression 4).

$$AF\_val\_dlt\_x(n) = \{AFval\_x(n) - AFval\_x(n-1)\} - \{AFval\_x(n-1) - AFval\_x(n-2)\} \quad \text{(Expression 4)}$$

In this case, the "h" denotes that the evaluation value is in the horizontal direction. The "v" denotes that the evaluation value is in the vertical direction. The numerical subscripts "1", "2", and "3" of the "h" denote the types of cutoff frequencies in an HPF process for generating the evaluation value. In the example of the present embodiment, the "1" denotes the lowest cutoff frequency and the "3" denotes the highest cutoff frequency.

Figure 9:
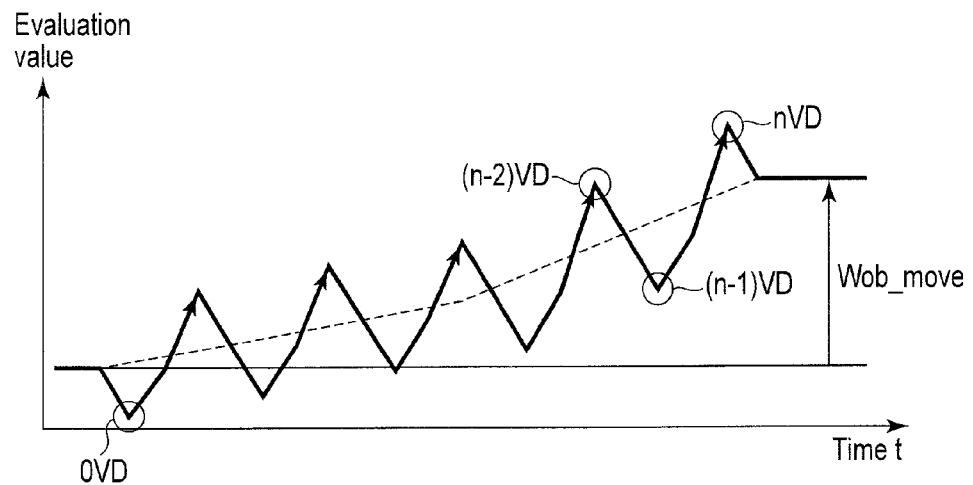
FIG. 9 is a view of the change of an evaluation value when a focus position direction and a wobbling direction are in the same direction.
Figure 10:
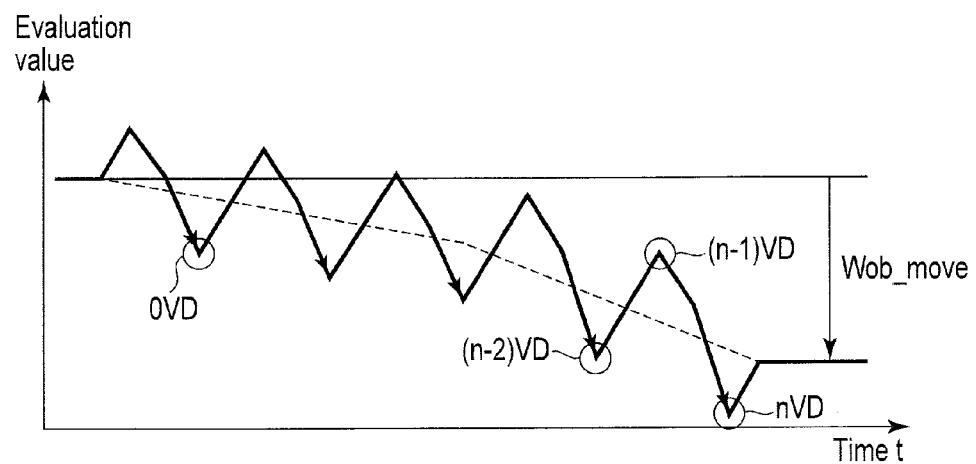
FIG. 10 is a view of the change of an evaluation value when a focus position direction and a wobbling direction are in the opposite direction.

FIG. 9 is a view of the change of an evaluation value when a focus position direction and a wobbling direction are in the same direction (for example, when the wobble operation is performed in the close distance direction because the subject is in the close distance direction). FIG. 10 is a view of the change of an evaluation value when a focus position direction and a wobbling direction are in the opposite direction (for example, when the wobble operation is performed in the close distance direction although the subject is in the far distance direction).

In a wobble operation, the focus lens moves with minute vibrations to explore the focus position. At that time, when the wobbling frequency is synchronized with the image frame, the movement direction of the focus lens obtained from the evaluation value of the frame nVD and the movement direction of the focus lens obtained from the evaluation value of the frame (n−2)VD are in the same direction. Further, in a wobble operation, the focus lens is gradually moved in a direction where the evaluation value increases. Accordingly, when an amount of change in the evaluation value AFval_dlt_x(n) is a positive number, it can be determined that the subject is in the same direction as the current wobbling direction (Wob_move shown in FIG. 9), as shown in FIG. 9. Conversely, when the amount of change in the evaluation value AFval_dlt_x(n) is a negative number, it can be determined that the subject is in the direction opposite to the current wobbling direction (Wob_move shown in FIG. 10) as shown in FIG. 10. As described above, the wobbling direction is determined according to the sign of the amount of change in the evaluation value AFval_dlt_x(n).

Actually, however, when the amount of change in the evaluation value AFval_dlt_x(n) is equal to or more than the positive threshold, the following wobbling direction is in the same direction as the previous wobbling direction. When the amount of change in the evaluation value AFval_dlt_x(n) is equal to or smaller than the negative threshold, the following wobbling direction is in the direction opposite to the previous wobbling direction. When the amount of change in the evaluation value AFval_dlt_x(n) exceeds neither the positive threshold nor the negative threshold, it is determined that the wobbling direction cannot be determined.

In this case, when the change of the evaluation value is stable, for example, because both of the camera body 200 and the subject are fastened, the sign of the amounts of change in the evaluation values AFval_dlt_h1(n), AFval_dlt_h2(n), AFval_dlt_h3(n), and AFval_dlt_v(n) become identical to each other. This is because, in this case, the change of the evaluation value approximately depends on the change of the focus lens position.

On the other hand, when the change of the evaluation value is unstable, the sign of the amounts of change in the evaluation values AFval_dlt_h1(n), AFval_dlt_h2(n), AFval_dlt_h3(n), and AFval_dlt_v(n) are not necessarily identical to each other. For example, when the head of a person who is walking quickly is brought into focus, the evaluation value in the horizontal direction repeatedly increases and decreases even without a wobble operation, as shown in FIG. 8. On the other hand, the evaluation value in the vertical direction changes, depending on the change of the focus lens position.

When the wobble operation is performed under this circumstance, the amounts of change in the evaluation values AFval_dlt_h1(n), AFval_dlt_h2(n), and AFval_dlt_h3(n) in horizontal direction change not only due to the wobble operation but also due to the up-and-down motion of the head. On the other hand, the amount of change in the evaluation value AFval_dlt_v in the vertical direction is hardly affected by the up-and-down motion of the head. Accordingly, when the focus direction is finally determined in the wobble operation, the result from the focus direction determination using the amount of change in the evaluation value in the vertical direction is given top priority. This most reliably determines the focus direction and can reduce the possibility of an error in the focus direction determination or a false focus.

The amounts of change in the evaluation values AFval_dlt_h1(n), AFval_dlt_h2(n), and AFval_dlt_h3(n) are obtained from the different cutoff frequencies in the HPF process, respectively. When the focus on the subject is bad while the cutoff frequency is high in the HPF process, a frequency high enough to exceed the cutoff frequency cannot be extracted. Thus, the amount of change in the evaluation value hardly changes, even though the amount is affected by the up-and-down motion of the head. Accordingly, when the focus direction is finally determined in the wobble operation, the result from the focus direction determination using the amount of change in the evaluation value according to a high cutoff frequency is given top priority. This reliably determines the focus direction and can reduce the possibility of an error in the wobbling direction determination or a false focus.

Based on the above-mentioned idea, the body control unit 203 finally determines the focus direction using the determination tables shown in FIGS. 11A and 11B. The determination tables shown in FIGS. 11A and 11B are previously stored in a memory provided in the body control unit 203. The determination tables divide the conditions for finally determining the focus direction into items. In the example of FIGS. 11A and 11B, the lower number determines the focus direction more reliably.

Here, a "horizon 1", a "horizon 2", and a "horizon 3" shown in FIGS. 11A and 11B denote the condition for the focus direction determination using the amount of change in the evaluation value AFval_dlt_h1(n), the condition for the focus direction determination using the amount of change in the evaluation value AFval_dlt_h2(n), and the condition for the focus direction determination using the amount of change in the evaluation value AFval_dlt_h3(n), respectively. The "verticality" denotes the condition for the focus direction determination using the amount of change in the evaluation value AFval_dlt_v. The "same" denotes that the wobbling directions are determined by the focus direction determinations are the same. The wobbling directions are determined using the amounts of change in the evaluation values put with "same" in the same item number. The amounts of change in the evaluation values are put with "same" in the same item number. The "circle" denotes that the wobbling direction has been determined by the focus direction determination using the amount of change in the evaluation value of the column. The "-" denotes that it makes no difference whether the wobbling direction has been determined by the focus direction determination using the amount of change in the evaluation value or not. The "determined" denotes that the focus direction can finally be determined. The "not determined" denotes that the focus direction cannot finally be determined.

FIG. 12 is a flowchart of an exemplary process for determining a focus direction during a wobble operation. The body control unit 203 determines in FIG. 12 whether the change of the evaluation value is unstable (S301). The determination in S301 is performed in the same manner as that of S201. The determination will be described in detail below.

When it is determined in S301 that the change of the evaluation value is stable, the body control unit 203 determines the wobbling direction using a first determination table (S302). The body control unit 203 determines in S302 which conditions among the nine items shown in FIG. 11A are satisfied with the result from the focus direction determination using the amount of change in the evaluation value AFval_dlt_h1(n), the result from the focus direction determination using the amount of change in the evaluation value AFval_dlt_h2(n), the result from the focus direction determination using the amount of change in the evaluation value AFval_dlt_h3(n), and the result from the focus direction determination using the amount of change in the evaluation value AFval_dlt_v(n). As shown in FIG. 11A, in the first table, when one of the conditions "1" to "9" is satisfied, the focus direction can finally be determined.

The determination using the first determination table will be described in detail below. The body control unit 203 first determines in ascending order of the item number whether the conditions "1" to "4" shown in FIG. 11A are satisfied. For example, to determine the condition "1", the body control unit 203 determines whether the wobbling direction determined by the focus direction determination using the amount of change in the evaluation value AFval_dlt_v(n) in the vertical direction is in the same direction as the wobbling directions determined by the focus direction determinations using the amounts of change in the evaluation values AFval_dlt_h3(n) and AFval_dlt_h2(n) in the horizontal direction. When it is determined that the wobbling directions are in the same direction, the body control unit 203 determines the wobbling direction determined by the focus direction determination using the amount of change in the evaluation value AFval_dlt_v(n) in the vertical direction as the determined wobbling direction. When it is determined that the condition "1" is not satisfied, the body control unit 203 determines, in the same manner as the determination for the condition "1", whether the condition "2" is satisfied. Hereinafter, the body control unit 203 sequentially determines in the same manner whether the condition "3" is satisfied and whether the condition "4" is satisfied.

When it is determined that neither of the conditions "1", "2", "3", nor "4" is satisfied, the body control unit 203 determines whether the condition "5" shown in FIG. 11A is satisfied. In other words, the body control unit 203 determines whether the wobbling direction determined by the focus direction determination using the amount of change in the evaluation value AFval_dlt_h3(n) in the horizontal direction is in the same direction as the wobbling direction determined by the focus direction determination using the amount of change in the evaluation value AFval_dlt_h2(n) in the horizontal direction. When it is determined that the wobbling directions are in the same direction, the body control unit 203 determines the wobbling direction determined by the focus direction determination using the amount of change in the evaluation value AFval_dlt_h3(n) in the horizontal direction as the determined wobbling direction.

When it is determined that the condition "5" is not satisfied, the body control unit 203 determines in ascending order of the item number whether the conditions "6" to "9" shown in FIG. 11A are satisfied. For example, to determine the condition "6", the body control unit 203 determines whether the wobbling direction has been determined by the focus direction determination using the amount of change in the evaluation value AFval_dlt_v(n) in the vertical direction. When it is determined that the wobbling direction has been determined, the body control unit 203 determines the wobbling direction determined by the focus direction determination using the amount of change in the evaluation value AFval_dlt_v(n) in the vertical direction at that time as the determined wobbling direction. When it is determined that the condition "6" is not satisfied, the body control unit 203 determines, in the same manner as the determination for the condition "6", whether the condition "7" is satisfied. Hereinafter, the body control unit 203 sequentially determines in the same manner whether the condition "8" is satisfied and whether the condition "9" is satisfied.

When it is determined in S301 that the change of the evaluation value is unstable, the body control unit 203 determines the wobbling direction using a second determination table (S303). The body control unit 203 determines in S303 which conditions among the nine items shown in FIG. 11B are satisfied with the result from the focus direction determination using the amount of change in the evaluation value AFval_dlt_h1(n), the result from the focus direction determination using the amount of change in the evaluation value AFval_dlt_h2(n), the result from the focus direction determination using the amount of change in the evaluation value AFval_dlt_h3(n), and the result from the focus direction determination using the amount of change in the evaluation value AFval_dlt_v(n). As shown in FIG. 11B, the nine conditions in the second determination table are the same conditions as the first determination table shown in FIG. 11A. Accordingly, the determination using the second determination table is basically performed in the same manner as that using the first determination table. Note that, as shown in FIG. 11B, only when at least one of the conditions "1" to "4" is satisfied, it is determined that the focus direction can finally be determined in the case of the second determination table. In other words, when the change of the evaluation value is unstable, an error in the wobbling direction determination or a false focus possibly occurs. Thus, the focus direction is finally determined only when the wobbling direction determined by the focus direction determination using the amount of change in the evaluation value in the horizontal direction and the wobbling direction determined by the focus direction determination using the amount of change in the evaluation value in the vertical direction are in the same direction.

After the process in S302 or in S303 has been completed, the body control unit 203 determines whether the focus direction has finally been determined (S304). When it is determined in S304 that the focus direction has finally been determined, the body control unit 203 forwards the process to S103 shown in FIG. 3. When it is determined in S304 that the focus direction has not finally been determined, the body control unit 203 returns the process to S301. In this case, the next frame is subjected to the process from S301.

As described above, to determine the focus direction during a wobble operation, it is first determined, in descending order of reliability for the focus direction determination, whether the result from the focus direction determination based on the amount of change in the evaluation value in the horizontal direction and the result from the focus direction determination based on the amount of change in the evaluation value in the vertical direction are in the same direction. In consideration of both of the results from the focus direction determinations based on the amounts of change in the evaluation values in the two directions, the focus direction is finally determined. This can reliably determine the focus direction.

Here, to determine the wobbling direction in the focus direction determination during a wobble operation, the threshold for determining the wobbling direction can be set smaller than the standard threshold in the same manner as the focus direction determination during a scan operation.

Further, in the focus direction determination during a wobble operation, the focus direction is determined in descending order of reliability by a combination of a plurality of amounts of change in the evaluation values in the horizontal direction that have different cutoff frequencies. This enables reliable determination of the focus direction and can prevent an error in the wobbling direction determination or a false focus.

In light of this, three types of amounts of change in the evaluation values in the horizontal direction that have different cutoff frequencies are found to determine the focus direction in the present embodiment. However, two, four, or more types of amounts of change in the evaluation values in the horizontal direction that have different cutoff frequencies can be also found to determine the focus direction.

Next, the determination in S201 and S301 will be described in detail below. As described above, the unstable change of the evaluation value determined in S201 and S301 denotes that there is a factor causing the change of the evaluation value to be unstable; for example, the camera body 200's motion such as panning or tilting, or a subject shake.

First, the determination according to the camera body 200's motion such as panning or tilting will be described. In the present embodiment, for example, when the output from the gyro sensor 205 (output from the detection circuit 206) satisfies one of the following conditions, the panning or the tilting occurs. Thus, it is determined that the change of the evaluation value is unstable.

(Condition 3) abs(x)≥a threshold Th for determining whether a panning or a tilting occurs/the focal distance of the imaging lens 101

(Condition 4) abs(y)≥the threshold Th for determining whether a panning or a tilting occurs/the focal distance of the imaging lens 101 (Expression 5)

In this case, the abs(x) in the (Expression 5) denotes the magnitude (absolute value) of the angular speed in the X axis direction detected by the gyro sensor 205. The abs(y) denotes the magnitude of the angular speed in the Y axis direction detected by the gyro sensor 205. Further, the focal distance in the (Expression 5) denotes the focal distance of the whole optical system constituting the imaging lens 101.

To normalize the threshold with the focal distance, the threshold Th is divided by the focal distance. The threshold Th for determining whether a panning or a tilting occurs is preferably changed according to an AF process during motion picture recording or during recording other than motion picture recording (for example, still image recording).

Figure 13:
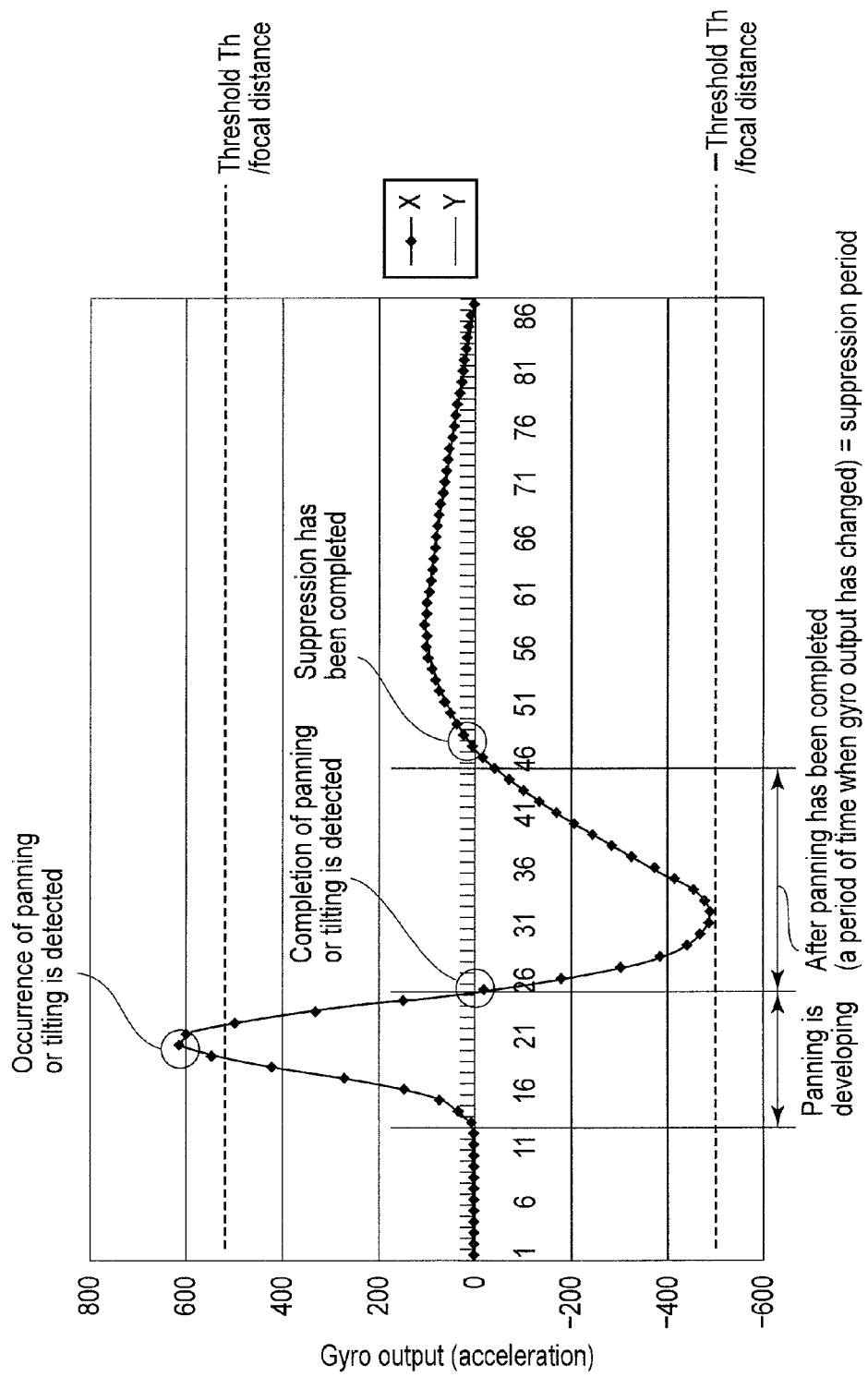
FIG. 13 is a view of an exemplary waveform of an output from a detection circuit.

Here, the detection circuit 206, for example, performs a secondary differentiation (for example, a high pass filter (HPF) process) with respect to an angular speed signal output from the gyro sensor 205 and then integrates the outputs to perform an HPF process again. In this case, an actual output from the detection circuit 206 appears as a waveform like the acceleration shown in FIG. 13. As shown in FIG. 13, an output value from the detection circuit 206 (the gyro sensor 205) widely swings in the opposite direction just after the panning or the tilting has been completed. A determination in S201 or S301 during such a suppression period causes an error in determination. Accordingly, during a suppression period satisfying the following condition, it is preferable that the determinations in S201 and S301 are not performed. (Condition 5) the case where the elapsed time after it is determined that the panning or the tilting has been completed is equal to or less than a given time, and a period of time when the sign of abs(DetAxis) is in reverse of the sign at the beginning and does not return.

Note that, when the following condition is satisfied even during the suppression period, it is determined that the panning or the tilting has been started.

(Condition 6) abs(DetAxis, at present)≥max{abs(DetAxis, a period from the start to the end of the panning or the tilting)}

Note that the abs(DetAxis, at present) denotes the current gyro sensor output. The max{abs(DetAxis, a period from the start to the end of the panning or the tilting)} denotes the maximum absolute value of the gyro sensor output during the period from the time when it is determined that the panning or the tilting has been started to the time when it is determined that the panning or the tilting has been completed in a VD period. The VD period denotes a period of time when a synchronization signal is output and the VD period is expressed by a horizontal axis shown in FIG. 13.

Next, the determination according to the subject shake will be described. In the present embodiment, for example, a motion vector is detected to detect a subject shake. To find the motion vector; the image data of a plurality of frames are obtained; it is found, for example, with a template matching, where the position of an image of interest (subject) in the current frame has been in the previous frame; and the movement amount and movement direction of the image of interest is found. Note that detecting a motion vector can also detect the above-mentioned panning or tilting.

Figure 14A:
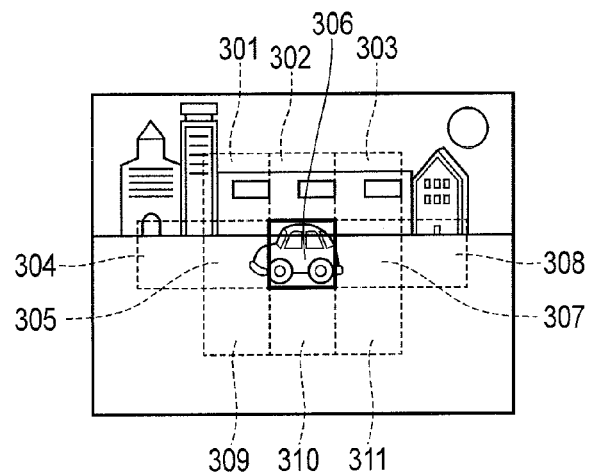
FIGS. 14A, 14B, and 14C are views of a process for finding motion vectors by detecting a main subject motion according to a template matching.
Figure 14B:
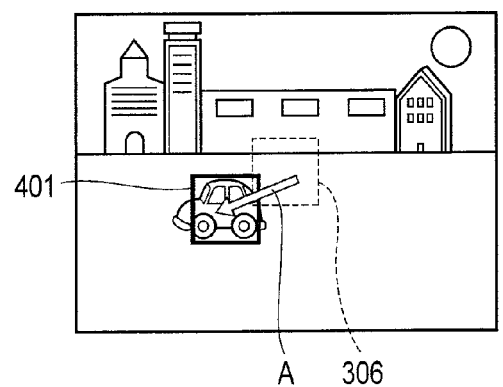
Figure 14C:
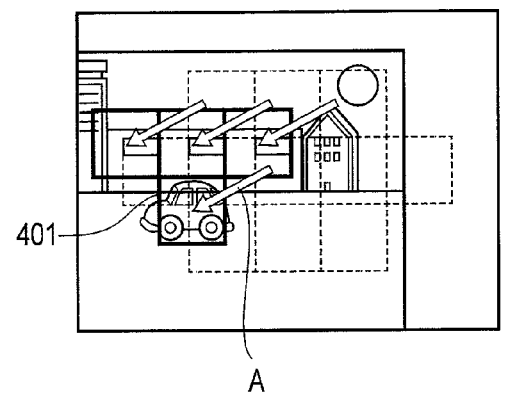

FIGS. 14A to 14C are views of a process for finding motion vectors by detecting a subject movement according to a template matching. The motion vectors are detected in parallel at a plurality of regions such as a plurality of AF target areas in a shooting screen. As shown in FIG. 14A, for example, each of AF target areas 301 to 311 is set in a template for detecting motion vectors. For example, an image in the AF target area 306 in a frame (n−1) is assumed as an image of interest. Then, the motion vector is calculated as the movement amount and movement direction of the image of interest between the frame (n−1) and a frame n. For example, when the subject that has been in the AF target area 306 in the frame (n−1) shown in FIG. 14A moves to the position of a numerical reference 401 in the frame n shown in FIG. 14B, the motion vector is shown as an arrow A shown in FIG. 14B. Motion vectors like this are calculated in the AF target areas as shown in FIG. 14C.

The conditions for the determinations according to the motion vectors calculated as shown in FIG. 14C will be described below. When one of the following conditions is satisfied, a subject shake occurs. Thus, it is determined that the change of the evaluation value is unstable.

(Condition 7) abs(a motion vector output [X])≥a threshold Thb for determining whether a subject shake occurs/the focal distance of the imaging lens (Condition 8) abs(a motion vector output [Y])≥the threshold Thb for determining whether a subject shake occurs/the focal distance of the imaging lens Here, the X and the Y denotes the motion vector of the subject as an X axis component and a Y axis component. The abs( ) denotes that the absolute value is calculated. The threshold Thb for determining whether a subject shake occurs is divided by the focal distance of the imaging lens at the right-hand sides of both of the expressions to normalize the threshold with the focal distance. This can detect the subject shake regardless of the focal distance of the imaging lens.

Figure 15:
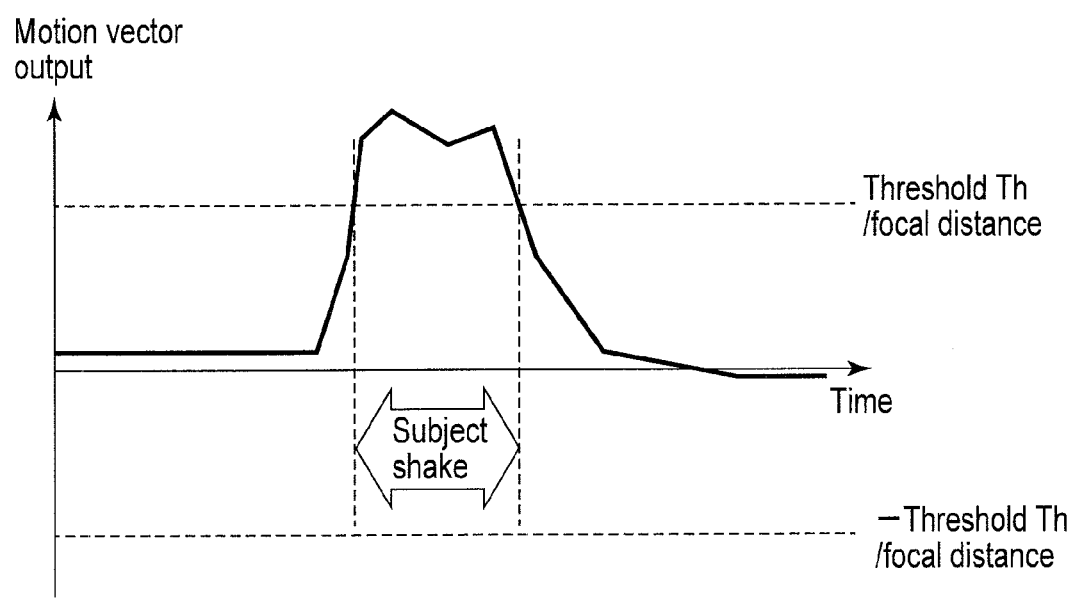
FIG. 15 is a view of an exemplary time variation of the motion vector output and the threshold, and a range where it is determined that a subject shake is developing.

FIG. 15 is a view of an exemplary time variation of the motion vector output and the threshold, and a range where it is determined that a subject shake is developing. In the example shown in FIG. 15, a part between dashed lines is the part where it is determined that the subject shake is developing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focus controller for an image pickup apparatus that includes an optical system including a focus lens movable in an optical axis direction and generating an optical image of a subject and also includes an imaging unit including a plurality of pixel parts and imaging the optical image, comprising:
   an evaluation value generating unit configured to obtain a first evaluation value based on a first signal output from the pixel part by scanning the pixel part in a first direction and obtain a second evaluation value based on a second signal output from the pixel part by scanning the pixel part in a second direction different from the first direction, the first and second evaluation values indicating a contrast of the subject; and
   a control unit configured to, while moving the focus lens, determine a movement direction of the focus lens to focus the focus lens based on each of changes of the first evaluation value and the second evaluation value and, in the case where a first movement direction is determined based on the first evaluation value and a second movement direction is determined based on the second evaluation value are in the same direction, perform an auto focus operation in order to move the focus lens in the movement direction determined as the same direction.

2. The focus controller according to claim 1,
   wherein the control unit determines that the movement direction of the focus lens is in the first movement direction by determining that an amount of change in the first evaluation value exceeds a first threshold, and determines that the movement direction of the focus lens is in the second movement direction by determining that an amount of change in the second evaluation value exceeds a second threshold.

3. The focus controller according to claim 2,
   wherein the control unit determines that the movement direction of the focus lens is in the first movement direction by determining that an amount of change in the first evaluation value exceeds a third threshold larger than the first threshold, and determines that the movement direction of the focus lens is in the second movement direction by determining that an amount of change in the second evaluation value exceeds a fourth threshold larger than the second threshold, in the case where the first movement direction and the second movement direction are not in the same direction.

4. The focus controller according to claim 3,
   wherein the control unit performs the auto focus operation in order to move the focus lens in a movement direction has been determined between a determination that the movement direction of the focus lens is in the first movement direction and a determination that the movement direction of the focus lens is in the second movement direction.

5. The focus controller according to claim 2, further comprising an unstable state determination unit configured to determine a state of the image pickup apparatus or subject is an unstable state,
   wherein when the unstable state determination unit determines that the image pickup apparatus or the subject is the unstable state, the control unit determines that the movement direction of the focus lens is in the first movement direction by determining that an amount of change in the first evaluation value exceeds a fifth threshold larger than the first threshold, and determines that the movement direction of the focus lens is in the second movement direction by determining that an amount of change in the second evaluation value exceeds a sixth threshold larger than the second threshold.

6. The focus controller according to claim 5,
   wherein the control unit determines that the movement direction of the focus lens is in the first movement direction by determining that an amount of change in the first evaluation value exceeds a seventh threshold larger than the fifth threshold, and determines that the movement direction of the focus lens is in the second movement direction by determining that an amount of change in the second evaluation value exceeds a eighth threshold larger than the sixth threshold, in the case where the first movement direction and the second movement direction are not in the same direction.

7. The focus controller according to claim 5, further comprising a motion detecting unit for detecting a motion amount of the image pickup apparatus,
   wherein, the unstable state determination unit determines that the image pickup apparatus is the unstable state when the motion amount is larger than a threshold.

8. The focus controller according to claim 5, further comprising a motion vector detecting unit for detecting a motion vector amount based on an output signal from the pixel part,
   wherein, the unstable state determination unit determines that the subject the unstable state when the motion vector amount is larger than a threshold.

9. A focus controller for an image pickup apparatus that includes an optical system including a focus lens movable in an optical axis direction and generating an optical image of a subject and also includes an imaging unit including a plurality of pixel parts and imaging the optical image, comprising:
   an evaluation value generating unit configured to obtain a first evaluation value based on a first signal output from the pixel part by scanning the pixel part in a first direction and obtain a second evaluation value based on a second signal output from the pixel part by scanning the pixel part in a second direction different from the first direction, the first and second evaluation values indicating a contrast of the subject; and
   a control unit configured to, while the focus lens is minutely vibrated with given amplitude, determine a movement direction of the focus lens to focus the focus lens based on each of changes of the first evaluation value and the second evaluation value and, in the case where a first movement direction is determined based on the first evaluation value and a second movement direction is determined based on the second evaluation value are in the same direction, perform an auto focus operation in order to move the focus lens in the movement direction determined as the same direction.

10. The focus controller according to claim 9,
    wherein the control unit determines the movement direction of the focus lens based on a first difference between the first evaluation value at a first point of one side of one minute vibration and the first evaluation value at a second point of the other side of the minute vibration and based on a second difference between the second evaluation value at the first point and the second evaluation value at the second point.

11. The focus controller according to claim 10,
    wherein the control unit calculates a third difference between the first evaluation value at the second point and the first evaluation value at a third point of one side of the other minute vibration, and determines the movement direction of the focus lens based on a fourth difference between the first difference and the third difference, and the control unit calculates a fifth difference between the second evaluation value at the second point and the second evaluation value at the third point, and determines the movement direction of the focus lens based on a sixth difference between the second difference and the fifth difference.

12. The focus controller according to claim 9,
wherein the evaluation value generating unit includes filters differing frequency components for extracting signals and calculates the first evaluation values by filtering the first signal using the filers, and
the control unit finally determines the movement direction when the first movement direction based on the first evaluation values and the second movement direction based on the other first evaluation values are in the same direction.

13. The focus controller according to claim 12,
wherein the filters are high pass filters differing cutoff frequencies.

14. The focus controller according to claim 9, further comprising an unstable state determination unit configured to determine a state of the image pickup apparatus or subject is an unstable state,
wherein the control unit finally determines the movement direction based on any one of the first movement direction based on the first evaluation values and the second movement direction based on the second evaluation values when the unstable state determination unit do not determines the state of the image pickup apparatus or subject is unstable, and
the control unit finally determines the movement direction based on none of the first movement direction based on the first evaluation values and the second movement direction based on the second evaluation values when the unstable state determination unit determines the state of the image pickup apparatus or subject is unstable.

15. The focus controller according to claim 14, further comprising a motion detecting unit for detecting a motion amount of the image pickup apparatus,
wherein, the unstable state determination unit determines that the image pickup apparatus is the unstable state when the motion amount is larger than a threshold.

16. The focus controller according to claim 14, further comprising a motion vector detecting unit for detecting a motion vector amount based on an output signal from the pixel part,
wherein, the unstable state determination unit determines that the subject the unstable state when the motion vector amount is larger than a threshold.

17. A focus controller for an image pickup apparatus that includes an optical system including a focus lens movable in an optical axis direction and generating an optical image of a subject and also includes an imaging unit including a plurality of pixel parts and imaging the optical image, comprising:
an evaluation value generating unit configured to obtain evaluation values by filtering a signal using the filers, the signal outputting from the pixel part by scanning the pixel part in a given direction, the evaluation values indicating a contrast of the subject;
an unstable state determination unit configured to determine a state of the image pickup apparatus or subject is an unstable state; and
a control unit configured to, while the focus lens is minutely vibrated with given amplitude, determine movement directions of the focus lens to focus the focus lens based on each of changes of the evaluation values,
wherein when at least two movement directions based on the evaluation values are in the same direction the control unit finally determines the movement direction is the same direction, and
the control unit do not finally determines the movement direction when the unstable state determination unit determines the state of the image pickup apparatus or subject is unstable, even if at least two movement directions based on the evaluation values are in the same direction.

18. The focus controller according to claim 17,
wherein the filters are high pass filters differing cutoff frequencies.

19. The focus controller according to claim 17, further comprising a motion detecting unit for detecting a motion amount of the image pickup apparatus,
wherein, the unstable state determination unit determines that the image pickup apparatus is the unstable state when the motion amount is larger than a threshold.

20. The focus controller according to claim 17, further comprising a motion vector detecting unit for detecting a motion vector amount based on an output signal from the pixel part,
wherein, the unstable state determination unit determines that the subject the unstable state when the motion vector amount is larger than a threshold.

* * * * *